(12) United States Patent
Muller et al.

(10) Patent No.: US 10,129,588 B2
(45) Date of Patent: Nov. 13, 2018

(54) DIGITAL BROADCASTING RECEIVER, METHOD FOR CONTROLLING DIGITAL BROADCASTING RECEIVER, SERVER, METHOD FOR CONTROLLING SERVER, AND COMPUTER-READABLE MEDIUM

(71) Applicant: Samsung Electronics Co., Ltd., Suwon-si (KR)

(72) Inventors: Yann Muller, Reading (GB); Jan-David Stephane Outters, Ashford (GB); Stephen Baker, Reading (GB); Thomas Bernard, Reading (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/906,152

(22) PCT Filed: Jul. 18, 2014

(86) PCT No.: PCT/KR2014/006571
§ 371 (c)(1),
(2) Date: Jan. 19, 2016

(87) PCT Pub. No.: WO2015/009115
PCT Pub. Date: Jan. 22, 2015

(65) Prior Publication Data
US 2016/0165300 A1    Jun. 9, 2016

Related U.S. Application Data

(60) Provisional application No. 61/856,121, filed on Jul. 19, 2013.

(30) Foreign Application Priority Data

Feb. 28, 2014 (GB) .................................. 1403596.8
Jul. 18, 2014 (KR) ....................... 10-2014-0091001

(51) Int. Cl.
*H04N 21/434* (2011.01)
*H04N 21/472* (2011.01)
(Continued)

(52) U.S. Cl.
CPC ........ *H04N 21/4345* (2013.01); *H04H 60/39* (2013.01); *H04N 21/2362* (2013.01);
(Continued)

(58) Field of Classification Search
None
See application file for complete search history.

(56) References Cited

U.S. PATENT DOCUMENTS 6,133,910 A * 10/2000 Stinebruner ......... H04N 5/4401
348/731
7,697,077 B2    4/2010 Van Horck
(Continued)

FOREIGN PATENT DOCUMENTS

CN    101300844    11/2008
EP     1976163    10/2008
(Continued)

OTHER PUBLICATIONS

Written Opinion of the International Searching Authority dated Nov. 3, 2014 in International Application No. PCT/KR2014/006571.
(Continued)

*Primary Examiner* — Alexander Q Huerta
(74) *Attorney, Agent, or Firm* — Staas & Halsey LLP

(57) ABSTRACT

A digital broadcast receiver transmits a request for discovery information to a discovery information server, the request including receiver profile information associated with the current state of the digital broadcast receiver. The server identifies, on the basis of the receiver profile information, additional services that are available over an IP with a digital broadcasting receiver, and transmits discovery information
(Continued)

for the additional services to the receiver. Then, the digital broadcast receiver determines a receiver channel number in order to locate the additional service at a channel guide on the basis of the received discovery information and logical channel numbers that are assigned to a plurality of broadcast services by a broadcast provider, and generates a channel guide by including the additional services in the determined receiver channel number and the plurality of broadcast services of the respective receiver channel numbers corresponding to the logical channel numbers.

12 Claims, 13 Drawing Sheets

(51) Int. Cl.

| | |
|---|---|
| *H04N 21/482* | (2011.01) |
| *H04N 21/2362* | (2011.01) |
| *H04N 21/462* | (2011.01) |
| *H04H 60/39* | (2008.01) |
| *H04N 21/438* | (2011.01) |
| *H04N 21/6336* | (2011.01) |
| *H04N 21/658* | (2011.01) |
| *H04N 21/258* | (2011.01) |
| *H04N 21/435* | (2011.01) |
| *H04N 21/454* | (2011.01) |

(52) U.S. Cl.
CPC ......... *H04N 21/25833* (2013.01); *H04N 21/25841* (2013.01); *H04N 21/435* (2013.01); *H04N 21/4383* (2013.01); *H04N 21/4542* (2013.01); *H04N 21/4622* (2013.01); *H04N 21/472* (2013.01); *H04N 21/482* (2013.01); *H04N 21/4821* (2013.01); *H04N 21/6336* (2013.01); *H04N 21/6582* (2013.01); *H04H 2201/30* (2013.01)

(56) References Cited

U.S. PATENT DOCUMENTS

| | | | |
|---|---|---|---|
| 7,711,314 B2 | 5/2010 | Schadenko | |
| 8,196,170 B2 | 6/2012 | Jun | |
| 2007/0016920 A1* | 1/2007 | Shin | H04H 20/28 725/31 |
| 2007/0099654 A1* | 5/2007 | Schadenko | H04N 5/4401 455/553.1 |
| 2007/0101385 A1* | 5/2007 | Jun | H04N 5/4401 725/112 |
| 2007/0250892 A1* | 10/2007 | Takagi | H04H 20/26 725/131 |
| 2008/0172701 A1 | 7/2008 | Hong et al. | |
| 2009/0086731 A1* | 4/2009 | Lee | H04H 60/73 370/389 |
| 2009/0097530 A1* | 4/2009 | Dhodapkar | H04H 60/43 375/131 |
| 2009/0158327 A1* | 6/2009 | Song | H04N 7/17318 725/38 |
| 2009/0158372 A1* | 6/2009 | You | H04N 7/165 725/110 |
| 2009/0178094 A1* | 7/2009 | Thomas | H04H 60/73 725/109 |
| 2009/0204986 A1* | 8/2009 | Lee | H04N 7/163 725/27 |
| 2012/0124632 A1* | 5/2012 | Rothschild | H04N 21/4263 725/114 |
| 2012/0216228 A1* | 8/2012 | Padi | H04N 21/4622 725/46 |
| 2013/0055313 A1* | 2/2013 | Eyer | H04N 21/482 725/49 |
| 2013/0055327 A1* | 2/2013 | Chandra | H04N 21/23614 725/109 |
| 2013/0117795 A1* | 5/2013 | Durn | H04N 21/4345 725/110 |
| 2013/0219435 A1* | 8/2013 | Pattison | H04N 21/4383 725/68 |
| 2015/0026724 A1* | 1/2015 | Alder | H04N 5/44543 725/40 |

FOREIGN PATENT DOCUMENTS

| | | |
|---|---|---|
| EP | 1654868 | 1/2014 |
| GB | 2499814 | 9/2013 |
| JP | 2008-167370 | 7/2008 |
| KR | 10-2009-0080320 | 7/2009 |
| KR | 10-2013-0049149 | 5/2013 |
| WO | 02/086691 | 10/2002 |
| WO | 2005/015900 | 2/2005 |
| WO | 2009/054652 | 4/2009 |
| WO | 2011/053858 | 5/2011 |
| WO | 2011/102826 | 8/2011 |
| WO | 2011/115426 | 9/2011 |
| WO | 2012/129762 | 10/2012 |

OTHER PUBLICATIONS

International Search Report dated Nov. 3, 2014 in International Application No. PCT/KR2014/006571.
Extended European Search Report dated Dec. 21, 2016 in European Patent Application No. 14826476.5.
"Allocation of identifiers and codes for Digital Video Broadcasting (DVB) systems", ETSI TS 101 162, v1.5,1, Jan. 2012, 34 pages.
"Transport of MPEG-2 TS Based DVB Services over IP Based Networks", ETSI TS 102 034, v1.4.1, Aug. 2009, 229 pages.
Original network id as defined inTS101162, 1 page http://www.dvbservices.com/identifiers/original_network_id.
Digital TV Group, "Digital Terrestrial Television Requirement for Interoperability", D-Book 7, PartA, Version 1.0, Mar. 2011, 790 pages.
Chinese Office Action dated Mar. 19, 2018 in Chinese Patent Application No. 201480040687.X.
Chinese Office Action dated Sep. 3, 2018 in Chinese Patent Application No. 201480040687.X.

\* cited by examiner

FIG. 4

| Syntax | Bits | Identifier |
|---|---|---|
| Entrypoint_list_descriptor(){<br>  descriptor_tag<br>  descriptor_lenghth<br>  descriptor_list_size<br>  for (i=0; i<=entrypoint_ilst_size; i++) {<br>    entrypoint_url_lenghth<br>    for (j=0; j<=entrypoint_url_lenghth; j++) {<br>      entrypoint_url_char<br>    }<br>  }<br>} | | |

FIG. 6

| Syntax | Bits | Identifier |
|---|---|---|
| alternative_logical_channel_descriptor{ | | |
|   descriptor_tag | 8 | uimsbf |
|   descriptor_lenghth | 8 | uimsbf |
|   list_lenghth | 16 | |
|   for (j=0; j<=list_lenghth; j++){ | | |
|     for (i=0; i<N; i++){ | | |
|       IDmode | 3 | |
|       if ((IDmode==0000) \|\| (IDmode==0001)){ | | |
|         ONID | 16 | |
|       } | | |
|       if (IDmode==0001){ | | |
|         Ts_id | 16 | |
|       } | | |
|       if ((IDmode==0000) \|\| (IDmode==0011)) \|\| (IDmode==0001)){ | | |
|         service_id | 16 | |
|       } | | |
|       if (IDmode==0010){ | | |
|         name_iength | 16 | |
|         for (i=0; i<=N; i++){ | | |
|           ServiceName | 8 | |
|         } | | |
|       } | | |
|       if (IDmode==0110){ | | |
|         AlTurl length | 16 | |
|         for (i=0; i<=N; i++){ | | |
|           AlTurl | | |
|         } | | |
|       } | | |
|       logical_channel_number | 16 | uimsbf |
|     } | | |
|   } | | |
| } | | |

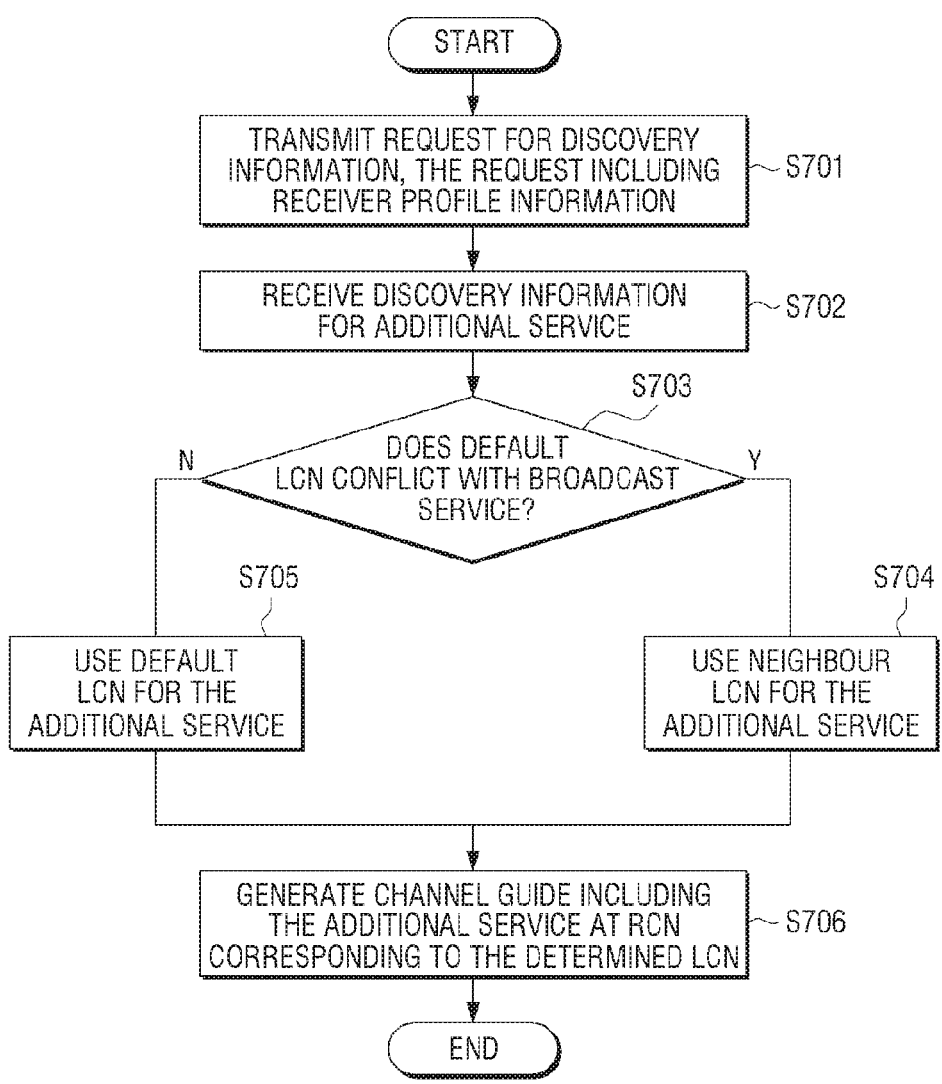

FIG. 8

| Syntax | Bits | Identifier |
|---|---|---|
| neighbour_logical_channel_descriptor{ | | |
|   descriptor_tag | 8 | uimsbf |
|   descriptor_lenghth | 8 | uimsbf |
|     for (i=0; i<N; i++){ | | |
|       IDmode | 4 | |
|       if ((IDmode==0000) \|\| (IDmode==0001)){ | | |
|         ONID | 16 | |
|       } | | |
|       if (IDmode==0001){ | | |
|         Ts_id | 16 | |
|       } | | |
|       if ((IDmode==0000) \|\| (IDmode==0011)) \|\| (IDmode==0001)){ | | |
|         service_id | 16 | |
|       } | | |
|       if (IDmode==0010){ | | |
|         list_length | 16 | |
|         for (j=0; j<=N; j++){ | | |
|           max_distance | 16 | |
|           IDmode | 2 | |
|           if ((IDmode==0000) \|\| (IDmode==0001)){ | | |
|             ONID | 16 | |
|           } | | |
|           if (IDmode==0001){ | | |
|             Ts_id | 16 | |
|           } | | |
|           if ((IDmode==0000) \|\| (IDmode==0011)) \|\| (IDmode==0001)){ | | |
|             service_id | 8 | |
|           } | | |
|           if (IDmode==0010){ | | |
|             name_length | 16 | |
|             for (i=0; i<=N; i++){ | | |
|               name | | |
|             } | | |
|           } | | |
|           if (IDmode==0110){ | | |
|             AlTurl length | 16 | |
|             for (i=0; i<=N; i++){ | | |
|               AlTurl | | |
|             } | | |
|           } | | |
|         } | | |
|       } | | |
|     } | | |
| } | | |

DIGITAL BROADCASTING RECEIVER, METHOD FOR CONTROLLING DIGITAL BROADCASTING RECEIVER, SERVER, METHOD FOR CONTROLLING SERVER, AND COMPUTER-READABLE MEDIUM

CROSS-REFERENCE TO RELATED APPLICATIONS

This application is a Continuation of International Application No. PCT/KR2014/006571, filed Jul. 18, 2014, which claims the benefit of U.S. Provisional Application No. 61/856,121, filed Jul. 19, 2013, in the U.S. Patent and Trademark Office, British Application No. 1403596.8, filed Feb. 28, 2014, in the British Intellectual Property Office, and Korean Application No. 10-2014-0091001, filed Jul. 18, 2014, in the Korean Intellectual Property Office, the disclosures of which are incorporated herein by reference.

BACKGROUND

1. Field

The following description relates to a digital broadcasting receiver, a method for controlling the digital broadcasting receiver, a server, a method for controlling the server, and a computer-readable medium, and more particularly, to a digital broadcasting receiver which may include an additional service in a channel guide by using discovery information, a method for controlling the digital broadcasting receiver, a server, a method for controlling the server, and a computer-readable medium.

2. Description of the Related Art

A broadcasting receiver can be used to receive and display content, for example TV and/or radio broadcast programs, on a plurality of channels received through a broadcast stream. To enable a user to review the available programs and select one of the programs for viewing, a channel guide is displayed which lists the broadcast channels and shows information about programs that are due to be broadcast within a predetermined time window. The channel guide can also be referred to as an Electronic Program Guide (EPG).

A conventional EPG is generated using metadata supplied by the broadcaster, and is limited to linear broadcast services which have been assigned logical channel numbers (LCNs) by the broadcaster. These LCNs determines the Receiver Channel Numbers (RCNs), which are the predetermined numbers at which the services are stored. Other services, for example video-on-demand (VOD) services, and receiver functions have to be selected through other menu screens. As more functions and other types of service are added, the user interface becomes more cumbersome as the user must navigate through various menu screens to locate and select the desired function or service. The disclosure is made in this context.

SUMMARY

Additional aspects and/or advantages will be set forth in part in the description which follows and, in part, will be apparent from the description, or may be learned by practice of the disclosure.

The present disclosure has been provided to address the aforementioned and other problems and disadvantages occurring in the related art, and an aspect of the present disclosure provides a digital broadcasting receiver which may include an additional service in a channel guide by using discovery information, a method for controlling the digital broadcasting receiver, a server, a method for controlling the server, and a computer-readable medium.

According to the present disclosure, a method for controlling a digital broadcasting receiver arranged to include respective Receiver Channel Numbers (RCNs) corresponding to Logical Channel Numbers (LCNs) assigned to a plurality of broadcast services includes: transmitting a request for discovery information for an additional service which is available in the digital broadcasting receiver, receiving the discovery information for the additional service, determining RCNs to place the additional service in the channel guide based on the received discovery information and the LCNs assigned to the plurality of broadcast services, and generating the channel guide so that the additional service is displayed in the determined RCNs, and the plurality of broadcast services are displayed in respective RCNs.

The request may include receiver profile information relating to a current state of the digital broadcasting receiver.

The discovery information may define a default LCN for the additional service. In response to a conflict between the additional service and one of the broadcast services at the RCN corresponding to the default LCN, the determining the RCN to place the additional service may include selecting a different LCN and using a RCN corresponding to the different LCN for the additional service.

The discovery information may include alternative LCN information defining an alternative LCN for the additional service. In response to a conflict at the RCN corresponding to the default LCN, the alternative LCN may be selected as the different RCN for the additional service.

The discovery information may include LCN group information defining a plurality of LCN groups for a plurality of additional services including said additional service. Each LCN group may include a plurality of different alternative LCNs for the plurality of services. The method may further include selecting one of the plurality of LCN groups by selecting an LCN group in which all the RCNs corresponding to the LCNs from said LCN group are available. The plurality of services may be included in the channel guide at the respective RCNs corresponding to the LCNs from the selected LCN group.

The discovery information may include neighboring LCN information defining a range of LCNs. The different LCN may be selected by selecting an available LCN within the defined range. The available LCN may be an LCN for which a corresponding RCN is available.

The discovery information may further define at least one of a list including a plurality of alternative LCNs and a list including a plurality of neighboring LCN ranges in response to a determination that there are no available RCNs corresponding to the LCNs within the defined range. The method may further include repeatedly checking at least one of whether a RCN corresponding to a next alternative LCN in the list is available and whether a RCN corresponding to any LCN in a next defined range in the list is available and selecting the available RCN for the additional service when an available RCN corresponding to the alternative LCN or neighboring LCN is found.

The method may further include receiving entry point server information through a broadcast stream and locating an entry point server based on the received entry point server information. The transmitting the request for discovery information may include transmitting the request to the entry point server.

The profile information may include at least one of region information identifying a geographical region in which the receiver is currently located, language setting information identifying a current language setting of the receiver, a Digital Video Broadcasting (DVB) Original Network Identifier (ONID), one or more DVB mode identifiers (modeIDs) defining types of channels to be included in the channel list, product identification information identifying a manufacturer and a model of the receiver, version information identifying a software version currently installed on the receiver, and parental control information defining an acceptable age rating.

The discovery information may define an age rating for content provided by the additional service. The method may further include determining whether the content provided by the additional service is acceptable under a current parental control setting of the receiver, by comparing an age rating defined for the additional service to an acceptable age rating defined by the parental control information. The additional service may be included in the channel guide only in response to a determination that the content is acceptable.

The receiver may be a Digital Video Broadcasting (DVB) receiver.

The discovery information may be received as a Service Discovery and Selection (SD&S) discovery record including a payload identifier ID. The payload ID may have a value indicating that the received SD&S discovery record relates to a static event.

According to the present disclosure, a method for controlling a server which is processed to provide discovery information includes: receiving a request for discovery information on an additional service which is available in a digital broadcasting receiver, identifying the additional service which is available in the digital broadcasting receiver over IP, generating discovery information on the identified additional service, and transmitting the discovery information to the digital broadcasting receiver.

The request may include receiver profile information relating to a current state of the digital broadcasting receiver. The identifying the additional service may include identifying the additional service which is available in the digital broadcasting receiver over IP based on the receiver profile information.

The profile information may include at least one of region information identifying a geographical region in which the receiver is currently located, language setting information identifying a current language setting of the receiver, a Digital Video Broadcasting (DVB) Original Network Identifier (ONID), one or more DVB mode identifiers (modeIDs) defining types of channels to be included in the channel list, product identification information identifying a manufacturer and a model of the receiver, version information identifying a software version currently installed on the receiver, and parental control information defining an acceptable age rating.

The receiver profile information may include the parental control information. The method may further include determining whether content provided by the additional service is acceptable under a current parental control setting of the receiver, by comparing an age rating defined for the additional service to an acceptable age rating defined by the parental control information. The discovery information on the additional service may be transmitted only in a determination that the content is acceptable.

According to the present disclosure, a computer-readable medium may be arranged to store a program for executing the method for controlling the digital broadcasting receiver having respective RCNs corresponding to respective LCNs assigned to a plurality of broadcasting services when the method is executed on a processor, the method comprising: transmitting a request for discovery information for an additional service which is available in the digital broadcasting receiver, receiving the discovery information for the additional service, determining RCNs to place the additional service in the channel guide based on the received discovery information and the LCNs assigned to the plurality of broadcast services, and generating the channel guide so that the additional service is displayed in the determined RCNs, and the plurality of broadcast services are displayed in respective RCNs.

According to the present disclosure, a digital broadcasting receiver may be arranged to include respective Receiver Channel Numbers (RCNs) corresponding to Logical Channel Numbers (LCNs) assigned to a plurality of broadcast services, the digital broadcasting receiver comprising: a discovery request transmitter arranged to transmit a request for discovery information for an additional service which is available in the digital broadcasting receiver, a discovery information receiver arranged to receive the discovery information for the additional service, and a processor arranged to determine RCNs to place the additional service in the channel guide based on the received discovery information and the LCNs assigned to the plurality of broadcast services and generate the channel guide so that the additional service is displayed in the determined RCNs, and the plurality of broadcast services are displayed in respective RCNs.

The request may include receiver profile information relating to a current state of the digital broadcasting receiver.

According to the present disclosure, a server arranged to be processed to provide discovery information includes: a discovery request receiver arranged to receive a request for discovery information for an additional service which is available in a digital broadcasting receiver from the digital broadcasting receiver, a service identification unit arranged to identify the additional service which is available in the digital broadcasting receiver over IP, a discovery information generator arranged to generate discovery information for the identified additional service, and a discovery information transmitter arranged to transmit the discovery information to the digital broadcasting receiver.

According to the present disclosure, a computer-readable medium may be arranged to store a program for executing the method for controlling the server when the method arranged to provide discovery information is executed on a processor, the method comprising: receiving a request for discovery information for an additional service which is available in a digital broadcasting receiver from the digital broadcasting receiver, identifying an additional service which is available in the digital broadcasting receiver over IP, generating discovery information for the identified additional service, and transmitting the discovery information to the digital broadcasting receiver.

BRIEF DESCRIPTION OF THE DRAWINGS

The above and/or other aspects of the present inventive concept will be more apparent by describing predetermined embodiments of the present inventive concept with reference to the accompanying drawings, in which:

FIG. 4 illustrates an entry point list descriptor for specifying the URL of an entry point server, according to an embodiment of the present disclosure;

FIG. 6 illustrates an alternative logical channel descriptor defining an alternative LCN for an additional service, according to an embodiment of the present disclosure;

FIG. 7 shows a flow diagram explaining a method of determining an RCN for an additional service, according to an embodiment of the present disclosure;

FIG. 8 illustrates a neighbor logical channel descriptor defining a range of channel numbers for an additional service, according to an embodiment of the present disclosure;

DETAILED DESCRIPTION

Figure 1:
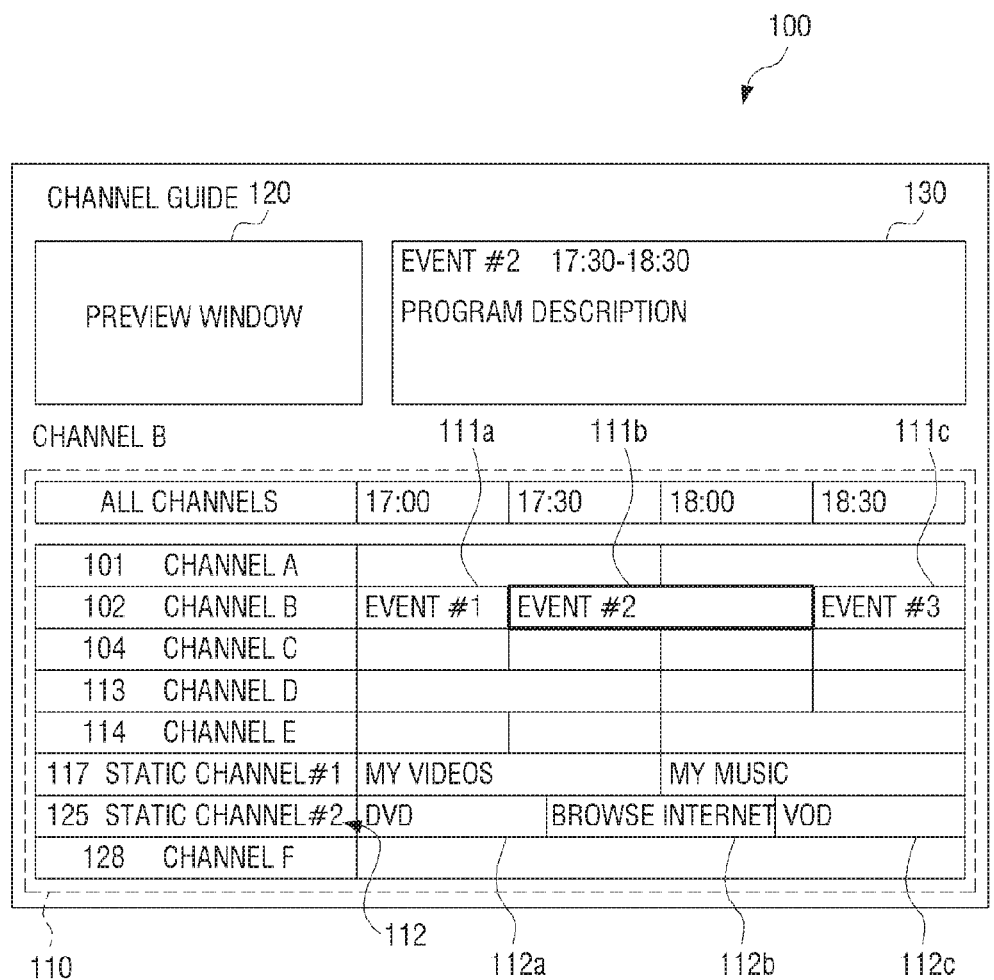
FIG. 1 shows a user interface displaying a channel guide including linear services and non-linear services, according to an embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Certain embodiments are described in greater detail below with reference to the accompanying drawings.

FIG. 1 shows a user interface displaying a channel guide including linear services and non-linear services, according to an embodiment of the present disclosure. Referring to FIG. 1, similar to a conventional channel guide, the channel guide of the present embodiment allows a user to review and select broadcast content from a plurality of channels. Depending on the embodiment, the channel guide could be displayed on a display integral to a digital broadcasting receiver, or on a physically separate display. For example, the digital broadcasting receiver could be integrated into a television, or could be a set-top-box (STB) connected to a television.

The channel guide 100 of the present embodiment comprises a channel list 110. The channel list 110 includes a plurality of linear services ordered according to their Logical Channel Numbers (LCNs), which can for example be assigned by the broadcaster or by a third party, such as a regulatory body. The linear services are commonly referred to as channels, and each one comprises a plurality of linear events. Each linear event represents a separate broadcast program. Here, 'linear' refers to the events within a service being broadcast in a linear fashion. That is to say, the events within a linear service are broadcast sequentially, in a specific order and at specific times. The linear services can, for example, be Radio Frequency (RF) broadcasting services, satellite broadcasting services, or Internet Protocol (IP) broadcasting services.

In the example shown in FIG. 1, the channel list displays six linear services (Channel A to Channel F), which are assigned the LCNs 101, 102, 104, 113, 114, and 128, respectively. The linear services are displayed at Receiver Channel Numbers (RCNs) corresponding to the assigned LCNs, by using the value of the LCN as the RCN in the channel list. For example, the service with LCN 101 is displayed at the receiver channel number 101 in the channel list. It will be understood that these specific channel names, LCNs and RCNs are merely exemplary. In other embodiments, a different number of channels could be displayed in the channel list, and any names and LCNs can be assigned to the channels.

Within the channel list 110, channel identifiers, for instance "Channel A", "Channel B", and so on, for the displayed channels are ordered according to the channel LCNs. Selection areas for linear events 111a, 111b, and 111c broadcast within a predetermined time window are displayed adjacent to the channel identifiers. The channel identifiers and event identifiers can be defined by metadata, which could, for example, be received through the broadcast stream or over IP. Such metadata can also define, for instance, the LCNs for the linear services, the broadcast times for the linear events, and textual descriptions of the linear events.

To view a program currently being broadcast on a particular channel, a user navigates through the channel list to the desired event. Any type of interface can be used to navigate the channel guide 100, such as a conventional remote controller or a motion recognition interface, for example. In the present example, the currently selected linear event is denoted by highlighting the current selection area. In the present example, the second linear event 111b on Channel B is selected, as indicated by the bold border.

Also, in the present example, the channel guide 100 further comprises a preview window 120 and an event information display area 130. When a linear event currently being broadcast is selected by first user input, visual content for the linear event can be displayed in the preview window 120, and information about the linear event can be displayed in the event information display area 130. In some embodiments, the preview window 120 and event information display area 130 can be omitted.

Furthermore, as shown in FIG. 1 the channel list 110 further includes two additional services 117 and 125, labeled as Static Channel #1 and Static Channel #2, respectively. In embodiments of the present disclosure, any number of additional services can be added to the channel list 110. The receiver determines the RCN for the additional services based on received service discovery information for the additional services.

In the present embodiment the additional services are 'static' channels which include a plurality of events that that are accessible at any time. Such events are hereinafter referred to as 'static events', in contrast to a conventional linear event which can only be accessed at the predefined broadcast time. That is, whereas a linear event disappears from the channel list after it has been broadcast, a static event remains in place since it is not associated with a specific broadcast time. Each static channel can be referred to as a 'non-linear service', by analogy with conventional broadcast channels which are linear services. However, the disclosure is not limited to adding non-linear services as additional services in a channel list. In other embodiments additional linear services can also be added to a list of other linear services. Examples of additional services that can be added include broadcast services for which a default LCN is not valid in the receiver's current geographical area, or for which the RCN corresponding to the default LCN value is already occupied by another broadcast service.

As described above, the width of each linear event in the channel list 110 is determined according to a time duration of the linear event. However, as the static events are not associated with particular broadcast times, the receiver must determine the width of each static event in other ways. In the present embodiment, event discovery information is received for each static event, which includes a width attribute defining the static event width in the channel guide.

Unlike a linear event, static events in the channel guide 100 are not limited to multimedia content. A static event can be used to select various receiver functions, in addition to accessing and reproducing audio/video content. In the present example, various types of static events are illustrated. As shown in FIG. 1, the second static channel 112 includes three static events 112a, 112b, and 112c. In response to user input selecting the first static event 112a on the second static channel 112, that is, the static event labeled 'DVD', the receiver is arranged to switch the input source for a display from the broadcast stream to a connected DVD player. In response to the user input selecting the second static event 112b on the second static channel 112, that is, the static event labeled 'Browse Internet', the receiver is arranged to launch a web browser application in order to access the Internet over a suitable network connection. In response to user input selecting the third static event 112c on the second static channel 112, that is, the static event labeled 'VOD', the receiver is arranged to display a video-on-demand (VOD) selection menu for a user to review and select available VOD content.

Also shown in FIG. 1 are other static events on the first static channel, labeled 'My videos' and 'My music'. These static events can be used to browse content grouped according to type. In response to user input select one of these static events, the receiver is arranged to display information about stored video files or music files, respectively, for a current user profile. For example, the video files or music files may be stored locally in a hard disk drive or other storage unit, and/or may be stored remotely, such as in cloud-based storage, for example.

Static events are not limited to the above-described actions. Other actions that can be performed in response to a particular static event being selected include, but are not limited to: connecting to a server to receive and reproduce online audio and/or video content (for example when the static event relates to a specific VOD content item); connecting to a local source to receive and reproduce local audio and/or video content (for example when the static event relates to a specific item of locally recorded content); launching a web browser application to display a specific webpage identified by a Uniform Resource Locator URL included in event discovery information for the selected static event; displaying a banner over the channel guide (for example, an advert for a forthcoming program on a particular broadcast channel); and setting a reminder for a linear event due to be broadcast at a predetermined time in the future.

Yet another example of a function that can be selected as a static event is launching a separate channel guide, which can be referred to as a 'sub-guide'. Here, one or more linear services and/or one or more non-linear services can be selected and displayed according to predetermined criteria. For example, a 'news' sub-guide could select and display only news channels, a 'sports' sub-guide could select and display only sports channels, and so on.

The use of static events provides the advantage that disparate content sources can be drawn together into a single list of content. For example, VOD content and locally recorded content can be added to the channel list in addition to conventional broadcast content. In contrast, in a conventional broadcasting receiver a channel list can only display broadcast content, meaning that a user must navigate away from the channel list to access other types of content (e.g. video-on-demand content). The need to go through additional menu screens to access non-broadcast content refers to the conventional receiver interface being slower to navigate and consuming more resources, as additional processing time and power is used when generating and displaying the other menu screens.

Figure 2:
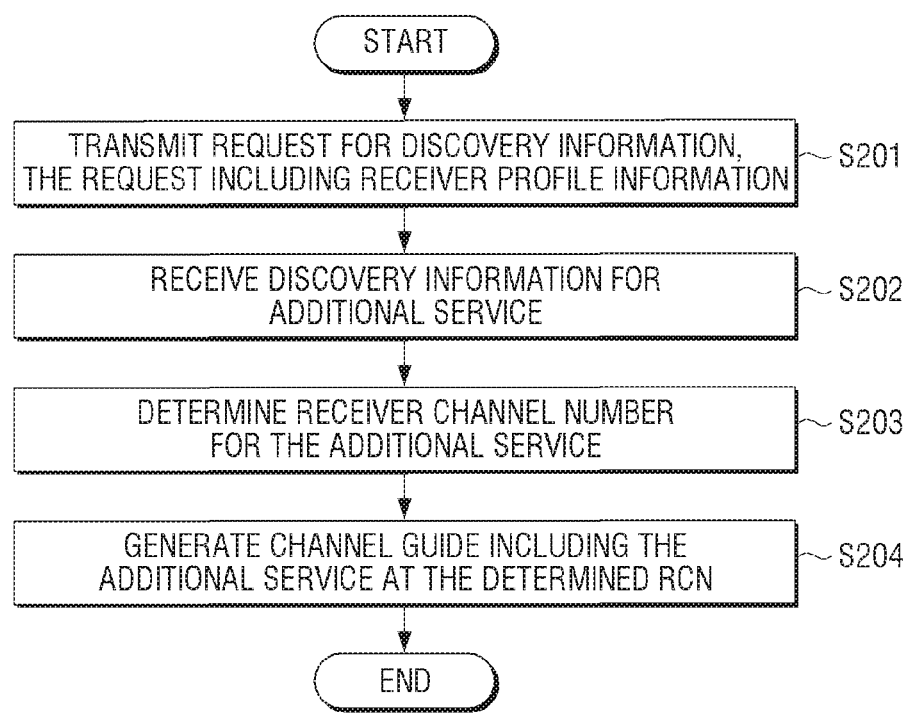
FIG. 2 shows a flow diagram explaining a method of controlling a digital broadcasting receiver according to an embodiment of the present disclosure.

FIG. 2 shows a flow diagram explaining a method of controlling a digital broadcasting receiver, according to an embodiment of the present disclosure.

In the present embodiment the receiver is a Digital Video Broadcasting (DVB) receiver, but in other embodiments other broadcasting standards can be used. Any operation in the method can be performed by software instructions executed on a general-purpose processor in the receiver, or can be performed by dedicated hardware.

To determine where to place an additional service in the channel guide, the digital broadcasting receiver uses the method shown in FIG. 2 to obtain discovery information for the additional service.

First, in operation S201, the receiver performs service discovery by transmitting a request for discovery information to a service discovery server. The discovery request includes receiver profile information relating to a current state of the digital broadcasting receiver. The service discovery server can use the receiver profile information to identify one or more additional services that are available to the digital broadcasting receiver.

Examples of the types of information that can be included in the receiver profile include, but are not limited to: region information identifying a geographical region in which the receiver is currently located; language setting information identifying a current language setting of the receiver; a DVB Original Network Identifier (ONID); one or more DVB mode identifiers (modeIDs) defining types of channels to be included in the channel list; product identification information identifying a manufacturer and/or model of the receiver; version information identifying a software version currently installed on the receiver; and parental control information defining an acceptable age rating. For example, the service discovery server can identify additional services that are available in the current geographical region of the receiver, and which are compatible with the installed software version and parental control setting of the receiver.

Next, in operation S202 the digital broadcasting receiver receives discovery information for an additional service from the service discovery server. Here, discovery information for any number of additional services can be received, depending on how many additional services have been identified by the server as being available to the digital broadcasting receiver.

Then, in operation S203 the digital broadcasting receiver determines a Receiver Channel Number (RCN) at which to place the additional service in the channel guide, based on the received discovery information and the LCNs assigned by the broadcast provider to the plurality of broadcast services. Methods of determining the LCN, and the corresponding RCN, for the additional service are described in more detail later.

Next, in operation S204 the digital broadcasting receiver generates the channel guide. When generating the channel guide, the digital broadcasting receiver includes the additional service at the determined Receiver Channel Number (RCN), and includes the plurality of broadcast services at the respective RCNs corresponding to the LCNs assigned to the broadcast services.

In DVB embodiments of the present disclosure, the discovery information can be received as a Service Discovery and Selection (SD&S) discovery record. In DVB systems, SD&S discovery records are provided in Extensible Markup Language (XML) format, and include a payload identifier (ID) which signals the type of discovery information contained in the record. In embodiments of the present disclosure, a new payload ID value can be defined which indicates to the digital broadcasting receiver that the received SD&S discovery record relates to a static event. Examples of DVB payload ID values are shown in Table 1, including a new payload ID value (0xF0) indicating that the discovery record relates to an additional service. In other embodiments, any unused payload ID value could be defined for the additional service discovery information.

TABLE 1

| PAYLOAD ID VALUE | RECORD TYPE |
| --- | --- |
| 0x01 | Service Provider Discovery Information |
| 0x02 | Broadcast Discovery Information |
| 0x05 | Package Discovery Information |
| 0x06 | BCG Discovery Information |
| 0xF0 | Additional Service Discovery Information |

Figure 3:
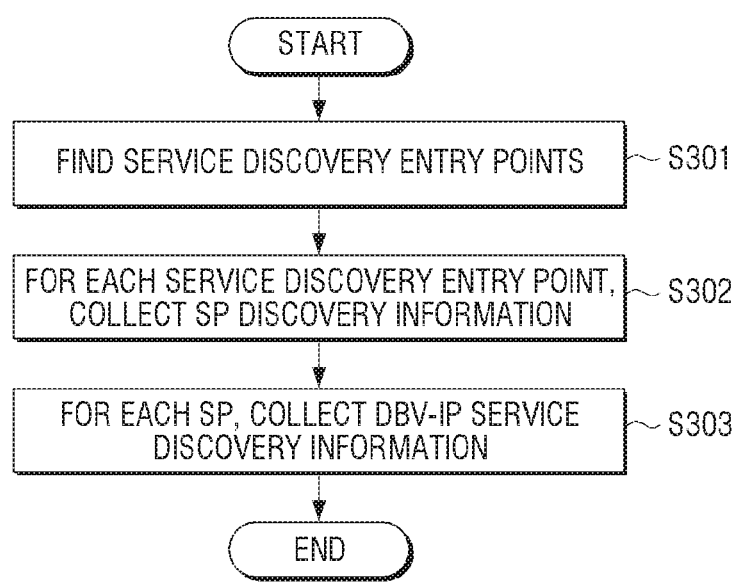
FIG. 3 shows a flow diagram explaining a service discovery method.

FIG. 3 shows a flow diagram explaining a service discovery method.

Referring to FIG. 3, service discovery is a well-understood process for identifying the services available to a receiver, and a detailed description will not be provided here. In DVB receivers, the service discovery process is referred to as service discovery and selection (SD&S). Operations S201 and S202 of FIG. 2, in which discovery information is requested and received from a server, can be performed as part of the SD&S process shown in FIG. 3. A service discovery method such as the one shown in FIG. 3 can be performed by the receiver on startup, and/or at any other time as required.

First, in operation S301 the receiver bootstraps itself by determining the location(s) of one or more entry point servers. A conventional DVB receiver determines the SD&S entry points by using an address hardcoded into the receiver, by acquiring a list of entry point servers via domain name system (DNS) lookup, or by acquiring a list of domain names via DHCP and then performing DNS lookup to identify the entry points.

Next, in operation S302 the receiver collects service provider (SP) discovery information from each entry point identified in operation S301. The SP discovery information identifies SPs offering DVB-IPTV services on the network to which the receiver is connected. In embodiments of the present disclosure, the receiver collects the SP discovery information by transmitting a request for discovery information to the entry point server as described above with reference to operation S201 of FIG. 2. That is, the receiver includes receiver profile information in the request transmitted to the entry point server by providing detailed information.

Then, in operation S303 the receiver collects DVB-IP service discovery information for each SP identified in operation S302. The DVB-IP service discovery information for a particular SP identifies the individual services provided by that SP. The receiver also collects event discovery information for individual events within each service. After completing operation S3203, the receiver is able to build a list of all available services from all available SPs.

Referring back to operation S301, in embodiments of the present disclosure a further mechanism is provided for determining the entry points, which can be used instead of or in addition to the conventional mechanisms. Specifically, in the present embodiment the digital broadcasting receiver is arranged to receive entry point server information through the broadcast stream, and locate an entry point server based on the received entry point server information. In this embodiment, the receiver can transmit the request for discovery information (operation S202 of FIG. 2) using operation S302 of FIG. 3, that is, by requesting SP discovery information from the entry point server specified through the broadcast stream. The receiver then continues by collecting DVB-IP service discovery information for each SP. This approach allows a broadcaster to signal the location of their own entry point server to the receiver, in order to add new services in addition to the existing broadcast services.

FIG. 4 illustrates an entry point list descriptor for specifying the URL of an entry point server, according to an embodiment of the present disclosure.

Referring to FIG. 4, the syntax illustrated in FIG. 4 is shown as an example of a suitable format for the entry point server information in a DVB embodiment. However, the disclosure is not limited to the syntax shown in FIG. 4, and in other embodiments different formats may be used for entry point server information transmitted through the broadcast stream.

As shown in FIG. 4, the entrypoint_list_descriptor includes an entrypoint_url_char element, which is used to carry the uniform resource locator (URL) of an entry point server. The entrypoint_url_length element specifies the number of characters in the URL, and the entrypoint_list_size specifies the number of entry points that are included in the list. In general, an entrypoint_list_descriptor can define the locations of any number of entry points.

Figure 5:
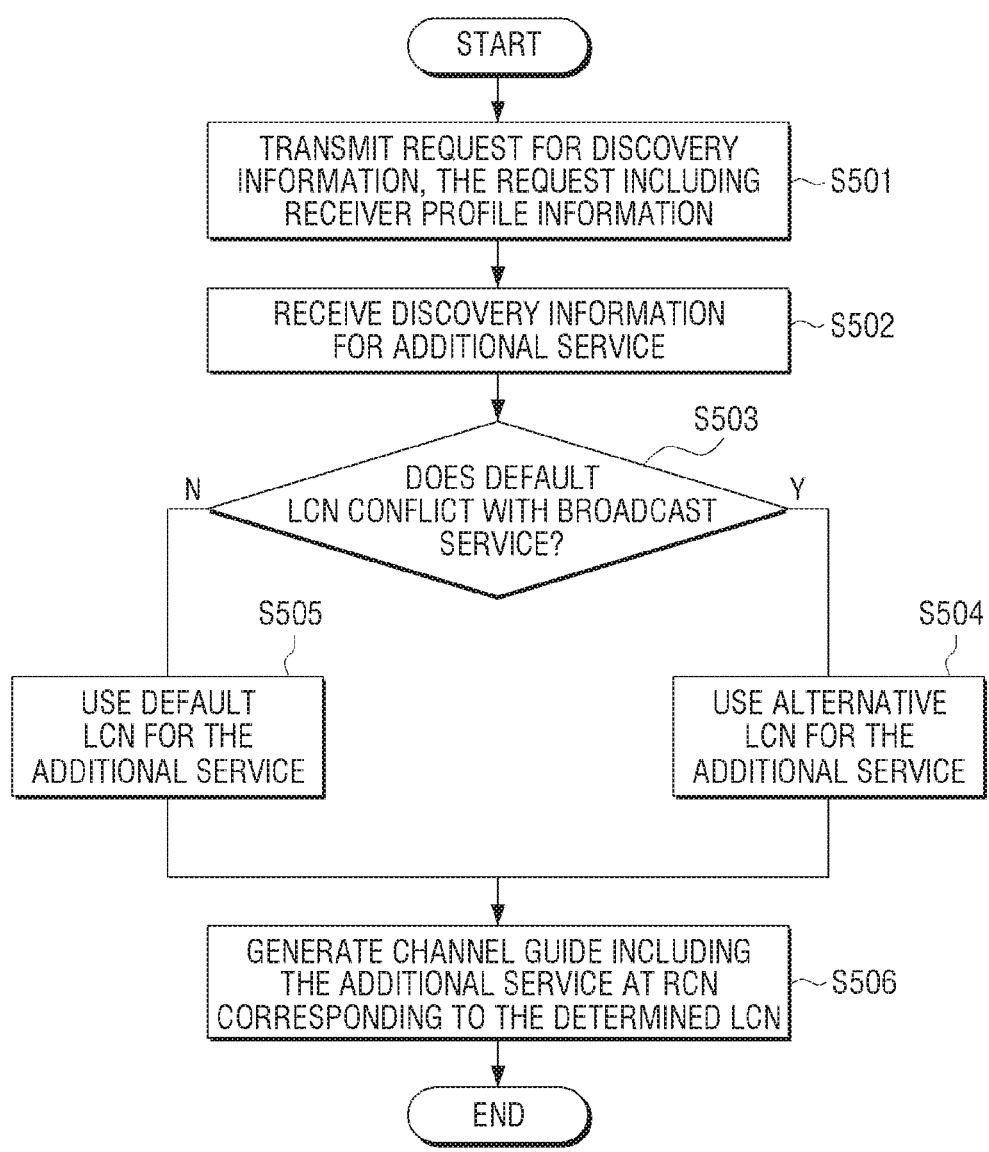
FIG. 5 shows a flow diagram explaining a method of determining an RCN for an additional service, according to an embodiment of the present disclosure.

FIG. 5 shows a flow diagram explaining a method of determining an RCN for an additional service, according to an embodiment of the present disclosure.

Referring to FIG. 5, operations S501, S502 and S506 are the same as operations S201, S202 and S204 of FIG. 2, respectively, and a detailed description will not be repeated here.

In the present embodiment, after receiving the discovery information for the additional service in operation S502, the digital broadcasting receiver checks in operation S503 whether there is a conflict between the additional service and one of the broadcast services at a default LCN defined by the discovery information for the additional service. There is a conflict if one of the broadcast services has already been assigned the same LCN as the default LCN defined by the discovery information for the additional service.

In operation S504, in response to a conflict between the additional service and one of the broadcast services at the RCN corresponding to the default LCN for additional service, the digital broadcasting receiver selects a different RCN for the additional service based on alternative LCN information. In the present embodiment, the discovery information for the additional service includes alternative LCN information defining an alternative LCN for the additional service. At operation S504, the alternative LCN is selected as the different LCN for the additional service, and in operation S506 the additional service is included in the channel guide at the RCN corresponding to the alternative LCN.

On the other hand, if there is no conflict, then, in operation S505, the digital broadcasting receiver uses the default LCN for the additional service, and, in operation S506, the additional service is included in the channel guide at the RCN corresponding to the default LCN.

FIG. 6 illustrates an alternative logical channel descriptor defining an alternative LCN for an additional service, according to an embodiment of the present disclosure.

As shown in FIG. 6, the alternative_logical_channel_descriptor includes a logical_channel_number element which holds the alternative LCN for the additional service. Any number of alternative LCNs can be defined, as specified by the list_length element. When a plurality of alternative LCNs are defined, the digital broadcasting receiver can repeatedly check whether the next alternative LCN in the list is available, that is, whether the next alternative LCN conflicts with an existing one of the broadcast services, until an available LCN has been found. The first available LCN amongst the plurality of alternative LCNs is then selected as the LCN for the additional service. That is, the first alternative LCN defined in the alternative_logical_channel_descriptor is selected in preference to the second alternative LCN, the second alternative LCN is selected in preference to the third alternative LCN, and so on.

The syntax shown in FIG. 6 can be used for the alternative LCN information in DVB embodiments of the present disclosure. However, in other embodiments a different format could be used.

FIG. 7 shows a flow diagram explaining a method of determining an RCN for an additional service, according to an embodiment of the present disclosure.

Referring to FIG. 7, the method is similar to the method of FIG. 5, and a detailed description of similar features will not be repeated here. In particular, operations S701, S702, S703, S705 and S706 are same as operations S501, S502, S503, S505 and S506, respectively.

However, the method of FIG. 7 differs from that of FIG. 5 in that the discovery information includes neighboring LCN information defining a range of channel numbers, instead of defining a specific alternative LCN. In response to a conflict being detected at operation S703, then, in operation S704, the digital broadcasting receiver selects a different LCN for the additional service by selecting an available LCN within the defined range, and in operation S706 the additional service is included in the channel guide at the RCN corresponding to the selected available LCN. Here, an 'available LCN' refers to an LCN for which the corresponding RCN is available.

FIG. 8 illustrates a neighbor logical channel descriptor defining a range of channel numbers for an additional service, according to an embodiment of the present disclosure.

Referring to FIG. 8, in the present embodiment, the neighbor_logical_channel_descriptor includes one or more max_distance elements, which define an LCN range in terms of a maximum distance from another LCN, for instance the default LCN defined by the discovery information. This allows the service provider to signal to the receiver that the additional service should be placed at the nearest RCN to the default LCN, up to a predetermined maximum distance from the default LCN. Similarly, in some embodiments a maximum distance can be defined with respect to an alternative LCN that has been specified by an alternative_logical_channel_descriptor as shown in FIG. 6. Furthermore, in other embodiments the LCN range may be defined differently, for example by specifying LCNs at either ends of the LCN range.

Also, in some embodiments of the present disclosure, the discovery information for the additional service can define a combination of one or more alternative LCNs and one or more neighboring LCN ranges, with a relative priority. For example, the discovery information can indicate that an available LCN within the neighboring LCN range is selected in preference to an alternative LCN also defined, or can indicate that the alternative LCN is selected in preference to an LCN from the neighboring LCN range.

As with FIG. 6, the syntax shown in FIG. 8 can be used for the neighboring LCN information in DVB embodiments of the present disclosure. However, in other embodiments a different format could be used.

Figure 9:
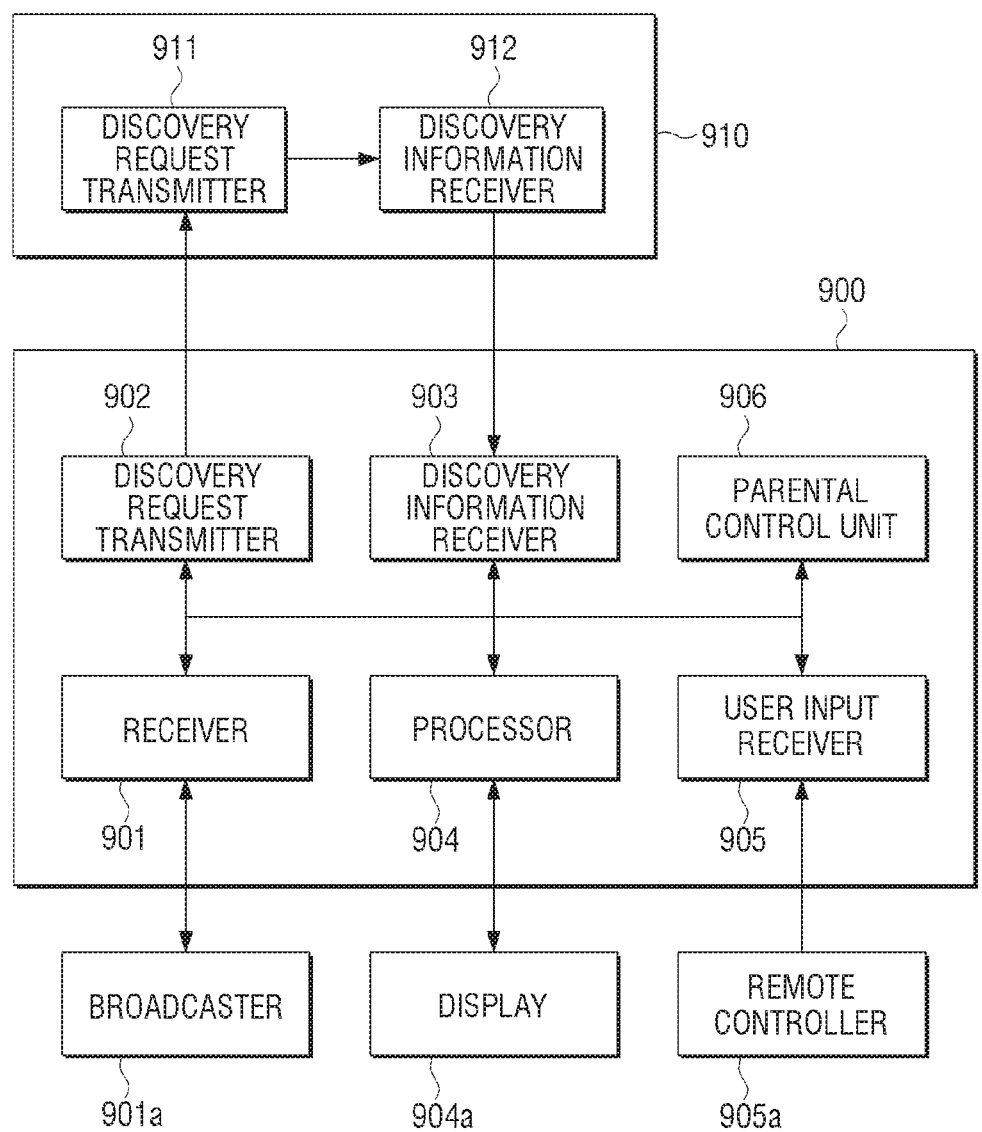
FIG. 9 is a block diagram illustrating a system including a digital broadcasting receiver and a server for providing discovery information to the receiver, according to an embodiment of the present disclosure.

FIG. 9 is a block diagram illustrating a system including a digital broadcasting receiver and a server for providing discovery information to the receiver, according to an embodiment of the present disclosure.

As shown in FIG. 9, the system comprises a digital broadcasting receiver 900, a discovery information server 910, a broadcaster 901a, a display 904a, and a remote controller 905a. The digital broadcasting receiver 900 can implement a method such as the one described above with reference to FIG. 2, to add additional services to a channel guide.

The digital broadcasting receiver 900 comprises a receiver 901, a discovery request transmitter 902, a discovery information receiver 903, a processor 904, a user input receiver 905, and a parental control unit 906. In some embodiments, the parental control unit 906 can be omitted, if parental control is not required. The receiver 901 is arranged to receive a plurality of linear services from the broadcaster 901a, such as through a terrestrial or satellite RF stream, or over IP, for example. The discovery request transmitter 902 is arranged to transmit a request for discovery information to the discovery information server 910, and the discovery information receiver 903 is arranged to receive event discovery information from the discovery information server 910.

The discovery information server 910 comprises a discovery request receiver 911 arranged to receive the request for discovery information from the digital broadcasting receiver 900, and a discovery information transmitter 912 arranged to transmit the discovery information to the digital broadcasting receiver 900. The discovery information and the request can both be sent over the same interface between the digital broadcasting receiver 900 and the discovery information server 910, or can be sent over different interfaces. In the present embodiment, the request and the discovery information are transmitted over IP, and the discovery request transmitter 902, the discovery information receiver 903, the discovery request receiver 911, and the discovery information transmitter 912 can communicate over any suitable network interface.

In the present embodiment, the digital broadcasting receiver 900 is embodied as a STB, and the display unit 904a is a television connected to the STB. That is, the digital broadcasting receiver 900 and display unit 904a are physically separate. As such, the processor 904 is arranged to control the display unit 904a to display a channel guide, such as the one shown in FIG. 1, including the plurality of linear services and the non-linear service. In other embodiments, however, the digital broadcasting receiver 900 and display unit 904a can be physically embodied as a single device. In response to user input selecting a static event in a non-linear service from the channel guide, for example, the processor 904 is arranged to perform one of a plurality of predetermined actions corresponding to the type of static event selected by the user input.

Also, in the present embodiment, the user input receiver 905 is arranged to receive the user input from a remote controller 905a, such as over an infrared (IR) link, for example. However, the present disclosure is not limited to receiving user input in this way. In other embodiments, the user input could be received differently. For example, the user input receiver 905a could be a motion tracking, eye tracking, or voice recognition interface arranged to detect user input directly, or a key-based user interface included in the digital broadcasting receiver 900.

Figure 10:
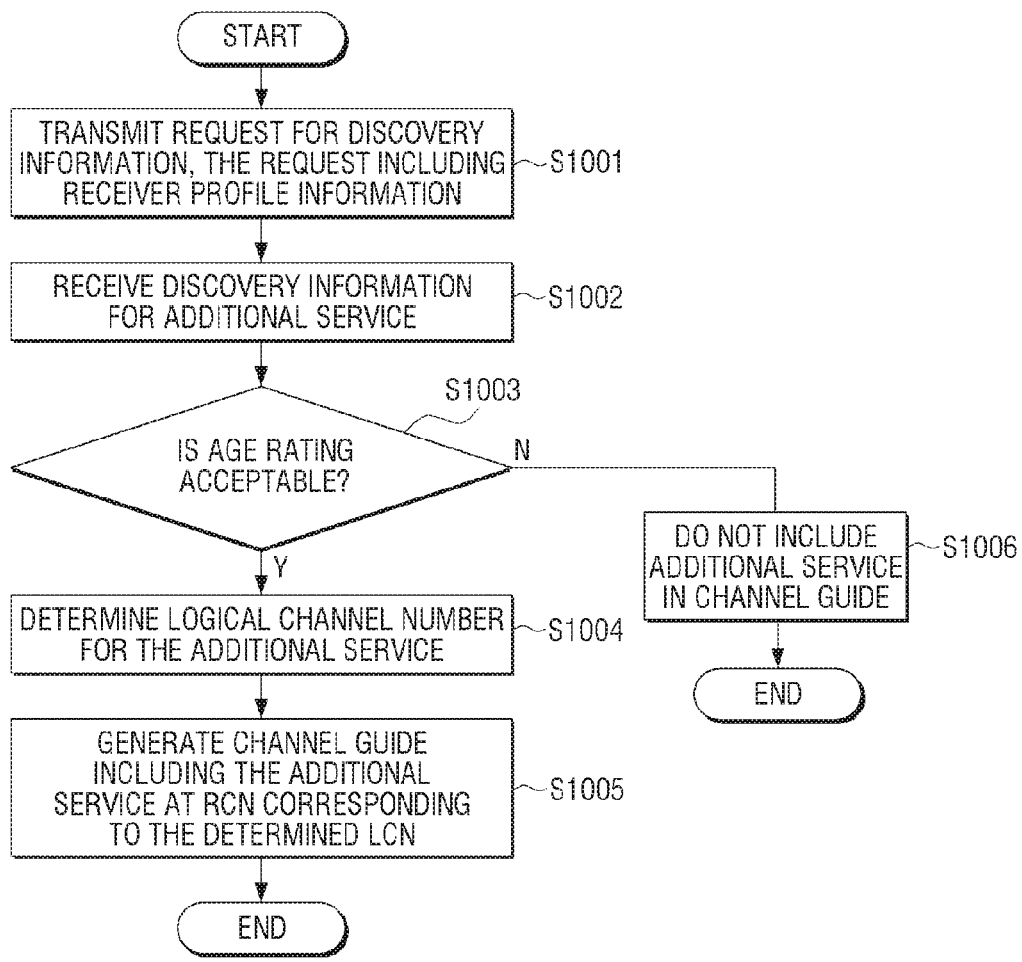
FIG. 10 shows a flow diagram explaining a method of determining whether to include an additional service in a channel guide, according to an embodiment of the present disclosure.

FIG. 10 shows a flow diagram explaining a method of determining whether to include an additional service in a channel guide, according to an embodiment of the present disclosure.

Referring to FIG. 10, operations S1001, S1002, S1004, and S1005 are the same as operations S201, S202, S203, and S204 of FIG. 2, respectively, and a detailed description will not be repeated here. Also, in operation S1004 the LCN can be determined using any of the above-described methods, for example as shown in FIGS. 5 and 7.

In the present embodiment, the discovery information defines an age rating for content provided by the additional service. Before determining an RCN for the additional service, in operation S1003 the digital broadcasting receiver determines whether the content provided by the additional service is acceptable under a current parental control setting of the receiver, by comparing the defined age rating for the additional service to an acceptable age rating defined by the parental control information. This check can be carried out by a parental control unit as shown in FIG. 9. The digital broadcasting receiver only proceeds to operations S1004 and S1005, to include the additional service in the channel guide at the RCN corresponding to the alternative LCN, in response to a determination that the content is acceptable. If it is determined in operation S1003 that the content provided by the additional service is not acceptable, then in operation S1006 the digital broadcasting receiver does not add the additional service to the channel guide. This method ensures that content which is unsuitable for the current age rating set in the receiver is not displayed in the channel guide.

Although in the present embodiment the age rating is checked before determining the LCN in operation S1004, in another embodiment operation S1003 could be performed at the same time as, or after, operation S1004. In general, operation S1003 can be performed at any time after receiving discovery information for the additional service (S1002) and before generating the channel guide (S1005).

Figure 11:
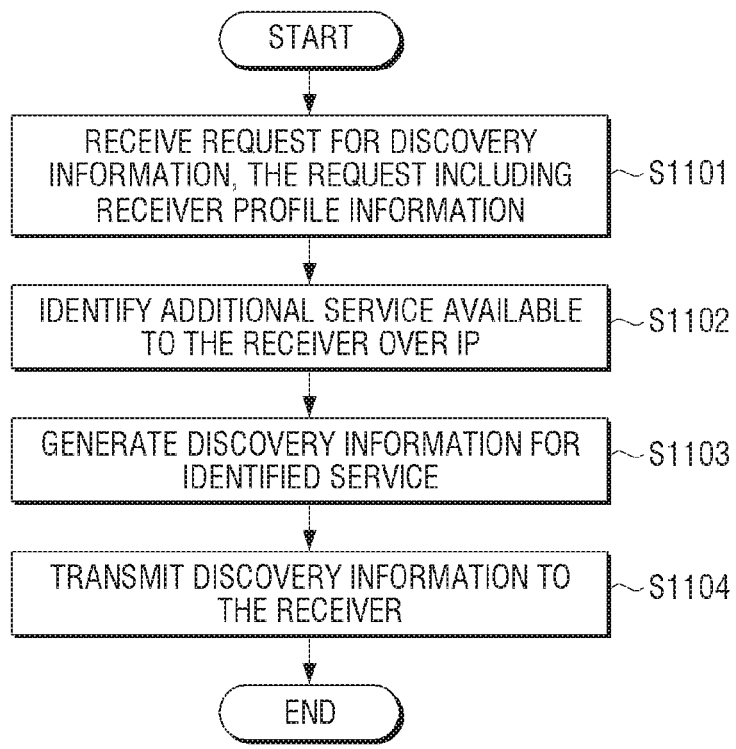
FIG. 11 shows a flow diagram explaining a method of providing discovery information for an additional service, according to an embodiment of the present disclosure.

FIG. 11 shows a flow diagram explaining a method of providing discovery information for an additional service, according to an embodiment of the present disclosure. The method can be performed by the discovery information server of FIG. 9.

Referring to FIG. 11, first, in operation S1101 the server receives a request for discovery information from a digital broadcasting receiver. As described above, the request includes receiver profile information relating to a current state of the digital broadcasting receiver. Then, in operation S1102 the server identifies an additional service available over IP to the digital broadcasting receiver, based on the receiver profile information. Next, in operation S1103 the server generates discovery information for the identified additional service, and in operation S1104 the server transmits the discovery information to the digital broadcasting receiver.

Figure 12:
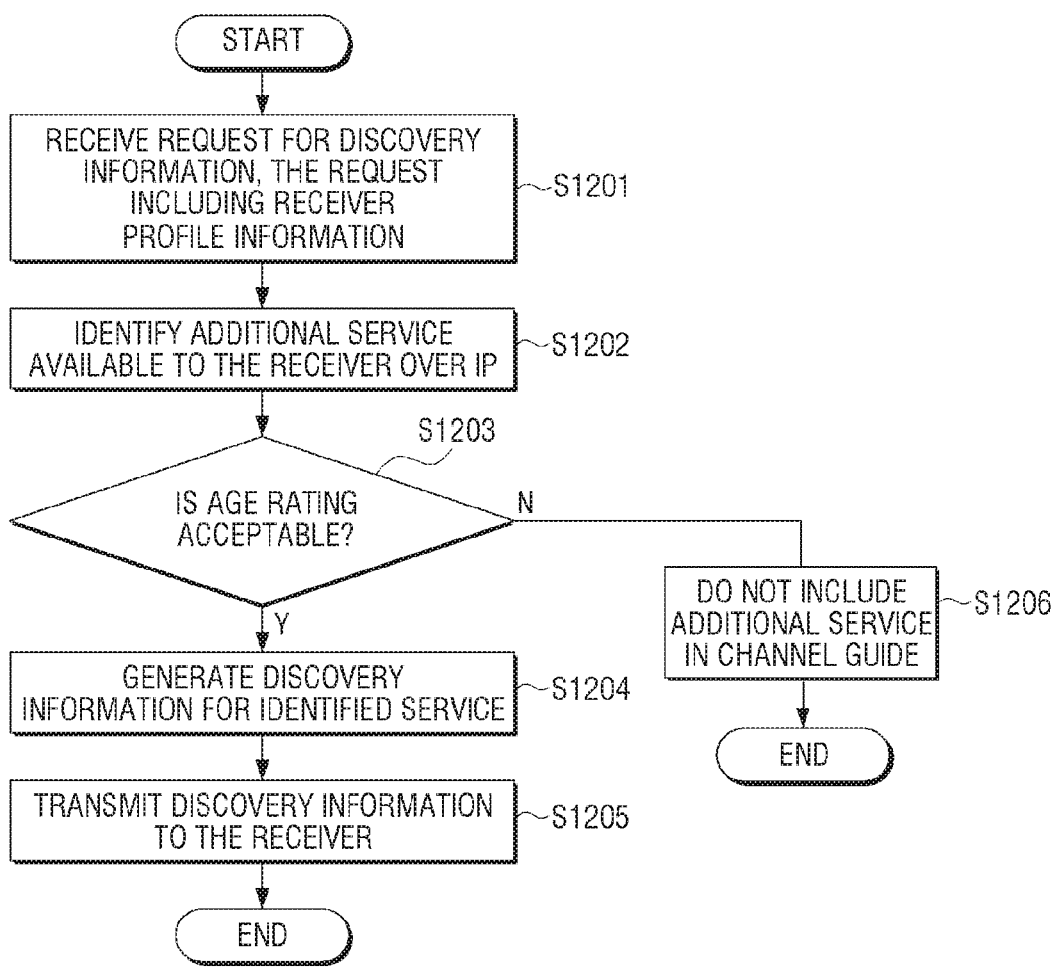
FIG. 12 shows a flow diagram explaining a method of determining whether to transmit discovery information for an additional service to a receiver, according to an embodiment of the present disclosure.

FIG. 12 shows a flow diagram explaining a method of determining whether to transmit discovery information for an additional service to a receiver, according to an embodiment of the present disclosure. The method allows parental control to be implemented at the server-end.

Referring to FIG. 12, operations S1201, S1202, S1204, and S1205 correspond to operations S1101, S1102, S1103, and S1104 of FIG. 11, respectively. However, in the present embodiment, the profile information includes parental control information defining an acceptable age rating. In operation S1203, the server determines whether content provided by the additional service is acceptable under the current parental control setting of the receiver, by comparing an age rating for the additional service to the acceptable age rating defined by the parental control information. The server only generates and transmits the discovery information in operations S1204 and S1205 if it is determined that the content is acceptable.

On the other hand, if it is determined in operation S1203 that the content provided by the additional service is not acceptable, then in operation S1206 the server does not transmit discovery information for the additional service to the digital broadcasting receiver. This method ensures that content which is unsuitable for the current age rating set in the receiver is not displayed in the channel guide. Also, in comparison to the method of FIG. 10, applying parental control filtering at the server has the advantage that discovery information will not be transmitted unnecessarily to the receiver.

Although in the present embodiment the age rating is checked before generating the discovery information in operation S1204, in another embodiment operation S1203 could be performed at the same time as, or after, operation S1204. In general, operation S1203 can be performed at any time after identifying the available additional service (S1202) and before transmitting the discovery information (S1205).

Figure 13:
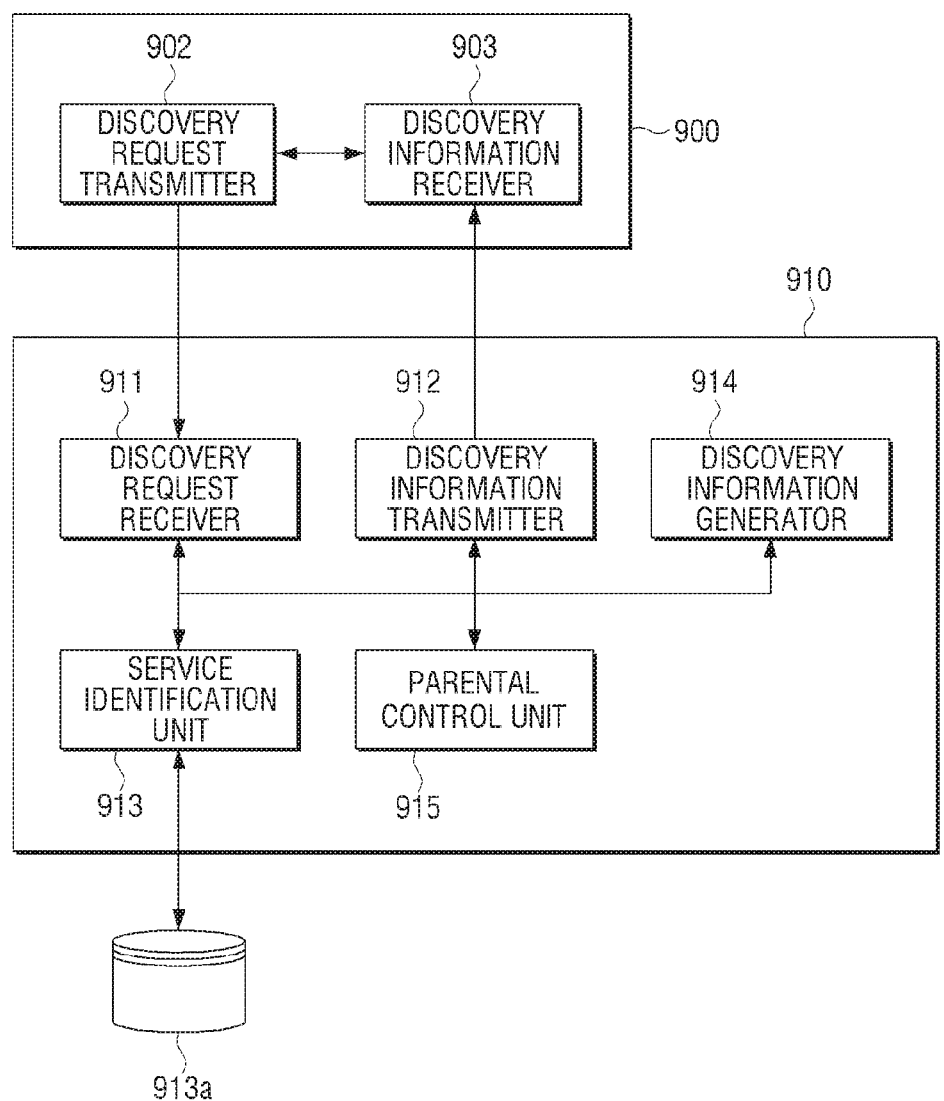
FIG. 13 schematically shows the server of FIG. 9 in more detail, according to an embodiment of the present disclosure.

FIG. 13 schematically shows the server of FIG. 9 in more detail, according to an embodiment of the present disclosure.

Referring to FIG. 13, in addition to the discovery request receiver 911 and discovery information transmitter 912, the server 910 comprises a service identification unit 913, discovery information generator 914, and parental control unit 915. The service identification unit 913 is arranged to query a service database 913a, which could be included in the server 910 or accessed remotely. The discovery information generator is arranged to generate discovery information using any of the above-described methods. The parental control unit 915 is arranged to apply parental control filtering using a method such as the one shown in FIG. 12. In some embodiments, the parental control unit 915 can be omitted.

Embodiments of the present disclosure have been described in which a non-linear service includes a plurality of static events, that is, events which are accessible at any time rather than only at specific predefined times. In some embodiments, a non-linear service can also include one or more linear events in addition to the static events. In such embodiments, since the linear event is associated with a particular broadcast time, the linear event can be displayed adjacent to the non-linear service identifier, together with the static events, when the channel guide is displaying a time window in which the linear event is to be broadcast. When the channel guide is displaying another time window, outside of the broadcast time of the linear event, the channel guide may only display the static events.

Embodiments of the present disclosure have been described in which linear services and additional services, such as non-linear services, are included in a channel list. As shown in FIG. 1, the additional service can be assigned an RCN corresponding to its own LCN, by using the value of the LCN as the RCN for the additional service. In general, any unused RCN can be used for the additional service, that is, any RCN not already occupied by another service. The RCN is determined by the receiver based on received service discovery information. In some embodiments, the additional service may not be assigned an RCN, but may be inserted between two linear services in the channel list. In this case, the additional service can be included at the determined RCN by inserting the additional service into the channel list adjacent to, that is, immediately before or after, the linear service that is displayed alongside the determined RCN. The service discovery information could identify where in the channel list the additional service is to be inserted. In yet other embodiments, a plurality of additional services can share the same LCN, which may be defined by the service discovery information.

Embodiments of the present disclosure have been described in relation to digital broadcasting receivers, and specifically DVB receivers. However, the disclosure is not limited to DVB systems. For example, other embodiments of the disclosure could operate in an Open IPTV Forum (OIPF) system, Digital Entertainment Content Ecosystem (DECE) system, Advance Televisions Systems Committee (ATSC) system or Integrated Services Digital Broadcasting (ISDB) system, instead of a DVB system.

Although a few embodiments of the disclosure have been described herein with reference to the drawings, it will be understood by those skilled in the art that many variations and modifications will be possible without departing from the scope of the disclosure as defined in the accompanying claims.

What is claimed is:

1. A method for controlling a digital broadcasting receiver, the method comprising:
identifying a plurality of Receiver Channel Numbers (RCNs) corresponding to Logical Channel Numbers (LCNs) respectively, the LCNs being respectively assigned to a plurality of linear broadcast services;
transmitting a request for discovery information for a non-linear service to which an LCN is not assigned;
receiving the discovery information comprising a default LCN for the non-linear service and information on an alternative LCN for the non-linear service;
based on a conflict between the default LCN for the non-linear service and the LCNs respectively assigned to the plurality of linear broadcast services, identifying another LCN for the non-linear service based on the information on the alternative LCN;
identifying an RCN of the non-linear service based on the another LCN for the non-linear service and the LCNs respectively assigned to the plurality of linear broadcast services; and
obtaining a channel guide comprising the non-linear service and the plurality of linear broadcast services which are displayed in respective RCNs,
wherein the plurality of linear broadcast services is broadcast linearly in a predetermined order and at a predetermined time.

2. The method of claim 1, wherein the request comprises receiver profile information relating to a current state of the digital broadcasting receiver.

3. The method of claim 2, further comprising:
receiving entry point server information through a broadcast stream; and
locating an entry point server based on the received entry point server information,
wherein the transmitting the request for discovery information comprises transmitting the request to the entry point server.

4. The method of claim 2, wherein the profile information comprises at least one of region information identifying a geographical region in which the receiver is currently located, language setting information identifying a current language setting of the receiver, a Digital Video Broadcasting (DVB) Original Network Identifier (ONID), one or more DVB mode identifiers (modeIDs) defining types of channels to be included in the channel list, product identification information identifying a manufacturer and a model of the receiver, version information identifying a software version currently installed on the receiver, and parental control information defining an acceptable age rating.

5. The method of claim 2, wherein the discovery information defines an age rating for content provided by the non-linear service, and
the method further comprises:
determining whether the content provided by the non-linear service is acceptable under a current parental control setting of the receiver, by comparing an age rating defined for the non-linear service to an acceptable age rating defined by the parental control information,
wherein the non-linear service is included in the channel guide only in response to a determination that the content is acceptable.

6. The method of claim 2, wherein the receiver is a Digital Video Broadcasting (DVB) receiver.

7. The method of claim 6, wherein the discovery information is received as a Service Discovery and Selection (SD&S) discovery record including a payload identifier ID,
wherein the payload ID has a value indicating that the received SD&S discovery record relates to a static event.

8. The method of claim 1, wherein the discovery information comprises LCN group information defining a plurality of LCN groups for a plurality of non-linear services including the non-linear service,
wherein each LCN group comprises a plurality of different alternative LCNs for the plurality of services,
and the method further comprises:
selecting one of the plurality of LCN groups by selecting an LCN group in which all the RCNs corresponding to the LCNs from the LCN group are available,
wherein the plurality of services are included in the channel guide at the respective RCNs corresponding to the LCNs from the selected LCN group.

9. The method of claim 8, wherein the discovery information comprises neighboring LCN information defining a range of LCNs,
wherein the different LCN is selected by selecting an available LCN within the defined range, and
wherein the available LCN is an LCN for which a corresponding RCN is available.

10. The method of claim 9, wherein the discovery information further defines at least one of a list including a plurality of alternative LCNs and a list including a plurality of neighboring LCN ranges in response to a determination that there are no available RCNs corresponding to the LCNs within the defined range, and the method further comprises:
repeatedly checking at least one of whether a RCN corresponding to a next alternative LCN in the list is available and whether a RCN corresponding to any LCN in a next defined range in the list is available; and
selecting the available RCN for the non-linear service when an available RCN corresponding to the alternative LCN or neighboring LCN is found.

11. A digital broadcasting receiver comprising:
at least one processor configured to identify a plurality of Receiver Channel Numbers (RCNs) corresponding to Logical Channel Numbers (LCNs) respectively, the LCNs being respectively assigned to a plurality of linear broadcast services;
a discovery request transmitter arranged to transmit a request for discovery information for a non-linear service to which an LCN is not assigned; and
a discovery information receiver arranged to receive the discovery information comprising a default LCN for the non-linear service and information on an alternative LCN for the non-linear service,
wherein the at least one processor is further configured to:
based on a conflict between the default LCN for the non-linear service and the LCNs respectively assigned to the plurality of linear broadcast services, identify another LCN for the non-linear service based on the information on the alternative LCN;
identify an RCN of the non-linear service based on the another LCN for the non-linear service and the LCNs respectively assigned to the plurality of linear broadcast services; and
obtain a channel guide comprising the non-linear service and the plurality of linear broadcast services which are displayed in respective RCNs,
wherein the plurality of linear broadcast services is broadcast linearly in a predetermined order and at a predetermined time.

12. The digital broadcasting receiver of claim 11, wherein the request comprises receiver profile information relating to a current state of the digital broadcasting receiver.

* * * * *